United States Patent [19]

Gaylord et al.

[11] 4,269,957

[45] May 26, 1981

[54] PEROXYGEN COMPOUND-METAL CARBOXYLATE REDOX CATALYST SYSTEM FOR VINYL MONOMER POLYMERIZATION

[75] Inventors: Norman G. Gaylord, New Providence; Meshulam Nagler, Irvington; Marvin M. Fein, Westfield, all of N.J.

[73] Assignee: Dart Industries Inc., Los Angeles, Calif.

[21] Appl. No.: 106,332

[22] Filed: Dec. 21, 1979

[51] Int. Cl.³ .............................................. C08F 14/06
[52] U.S. Cl. ..................................................... 526/192
[58] Field of Search ......................................... 526/192

[56] References Cited

U.S. PATENT DOCUMENTS

| | | | |
|---|---|---|---|
| 2,508,801 | 5/1950 | Sans | 526/192 |
| 2,981,724 | 4/1961 | Holdsworth | 526/192 |
| 2,996,490 | 8/1961 | Rowland et al. | 526/192 |
| 3,167,533 | 1/1965 | Donat | 526/192 |
| 3,515,705 | 6/1970 | Balitrand | 526/192 |
| 3,739,043 | 6/1973 | Fryd et al. | 526/192 |
| 3,739,044 | 6/1973 | Wald | 526/192 |
| 3,997,707 | 12/1976 | Aruga et al. | 526/192 |
| 4,091,197 | 5/1978 | Fischer et al. | 526/192 |

*Primary Examiner*—William F. Hamrock
*Attorney, Agent, or Firm*—Bryant W. Brennan; Harold R. Beck

[57] ABSTRACT

A process for the bulk or suspension polymerization of vinyl monomers, particularly vinyl chloride, in the presence of a redox catalyst system consisting of a peroxyester or diacyl peroxide and a stannous or antimony (III) carboxylate.

12 Claims, No Drawings

PEROXYGEN COMPOUND-METAL CARBOXYLATE REDOX CATALYST SYSTEM FOR VINYL MONOMER POLYMERIZATION

FIELD OF THE INVENTION

This invention relates to a process for the polymerization of various ethylenically unsaturated monomers, particularly vinyl chloride, in bulk or suspension systems, using a redox catalyst system consisting of a peroxyester or a diacyl peroxide and a stannous or antimony (III) carboxylate.

BACKGROUND OF THE INVENTION

The suspension polymerization of vinyl chloride is generally carried out at temperatures below 70° C. using organic soluble initiators. Although lauroyl peroxide was earlier the most widely used catalyst, in recent years other low temperature catalysts including azobisisobutyronitrile, diisopropyl peroxydicarbonate, t-butyl peroxypivalate and mixtures thereof, have been adopted. These and other catalysts are described in Pennwalt Corporation, Lucidol Division, Technical Bulletin 30.90, "Free Radical Initiators for the Suspension Polymerization of Vinyl Chloride" (1977).

The choice of initiator is dictated by its half-life and by its influence on the polymerization process and the properties of the poly(vinyl chloride) produced thereby.

The polymerization of vinyl chloride is characterized by a short induction period, followed by a gradually increasing rate of polymerization. During the earlier stages of the polymerization, the reaction rate is lower than the maximum so that the capacity of the reactor is not fully utilized. Peroxyesters reduce the induction period and, due to a more constant rate of polymerization, increase reactor productivity. Further, peroxyesters can generally be used at levels below that needed for peroxides and give much less chain branching during polymerization.

Although peroxyesters such as diisopropyl peroxydicarbonate and t-butyl peroxypivalate offer numerous advantages in vinyl chloride polymerization, their disadvantages include the necessity for low temperature shipping and storage and decreased efficiency at elevated temperatures.

The use of peroxyesters having higher decomposition temperatures is not feasible in present poly(vinyl chloride) production facilities due to the higher monomer pressures involved and the low molecular weight and poorer stability of the resultant resins. Nevertheless, the handling advantages of such peroxyesters makes their use extremely attractive.

The use of higher temperature catalysts at lower temperatures is a common practice in polymer technology. Thus, redox systems such as ammonium persulfate—sodium metabisulfite and hydrogen peroxide—ferrous sulfate are used in emulsion polymerization while benzoyl peroxide—dimethylaniline and methyl ethyl ketone peroxide—cobalt naphthenate are used in styrene—unsaturated polyester polymerization.

Reducing agents used in conjunction with monomer-soluble peroxyesters in the polymerization of vinyl chloride include potassium metabisulfite (N. Fischer and C. Lambling, French Patent No. 2,086,635 (1972), sodium bisulfite (H. Minato, K. Hashimoto, and T. Yasui, Japan. Patent No. 68 20,300 (1968), sodium bisulfite—cupric chloride (B. K. Shen, U.S. Pat. No. 3,668,194 (1972), sodium dithionite—ferrous sulfate (H. Minato, Japan. Patent No. 70 04,994 (1970) and trialkyl boron (R. Kato and I. Soematsu, Japan. Patent No. 5498('65) (1965); A. V. Ryabov, V. A. Dodonov, and Y. A. Ivanova, Tr. Khim. Khim. Tekknol., 1970, 238; Stockholms Superfosfat Fabriks A/B, Brit. Patent No. 961,254 (1964). The water-soluble reducing agents are more suitable for emulsion than for bulk or suspension polymerization while the trialkyl borons react with oxygen and require special handling.

SUMMARY OF THE INVENTION

An object of the present invention is to provide a process for the polymerization of ethylenically unsaturated monomers, particularly vinyl chloride, in the presence of peroxygen compounds at temperatures at which the latter are stable and readily handled. Another object of the present invention is to provide a process for the bulk or suspension polymerization of vinyl chloride at temperatures below 70° C. using peroxygen compounds which, at these temperatures, do not generate free radicals at a sufficient rate to initiate polymerization at a practical rate, if at all.

It has now been found that this improvement in unsaturated monomer, particularly vinyl chloride, polymerization can be achieved by utilizing a redox catalyst system consisting of a peroxyester or a diacyl peroxide and a stannous or antimony (III) carboxylate.

DETAILED DESCRIPTION OF THE INVENTION

According to the present invention, the polymerization of ethylenically unsaturated monomers, particularly vinyl chloride, is carried out in bulk or suspension, under the conditions applicable thereto and well known to those skilled in the art, using a catalyst system consisting of a monomer-soluble peroxyester or diacyl peroxide and a reducing agent which is a stannous or antimony (III) salt of a carboxylic acid.

The half-life of a free radical catalyst is the time required for 50% decomposition at a particular temperature. The half-life is only relevant as regards the temperature at which it is desired to conduct a polymerization, e.g. the polymerization of vinyl chloride below 70° C. to produce poly(vinyl chloride) with greater thermal stability than polymer produced above 70° C. The half-life of a peroxyester refers to thermal decomposition and, consequently, if a polymerization is to be conducted at 50° C., a catalyst with a half-life of 20 hours or less at 50° C., can be used for the polymerization, e.g. t-butyl peroxypivalate or t-butyl peroxyneodecanoate, as is well known to those skilled in the art.

However, if it is desired to conduct the polymerization with a catalyst which does not require refrigerated shipment and/or storage, which are required by t-butyl peroxypivalate and t-butyl peroxyneodecanoate, than in accordance with the present invention, a catalyst with a half-life of more than 50 hours at 50° C. can be used in the presence of a suitable reducing agent, e.g. t-butyl peroxyoctoate which has a half-life of 133 hours at 50° C. in the absence of the reducing agent may be used.

Alternatively, if it is desired to conduct polymerization at or below 25° C., in order to maintain better control of the reaction exotherm or to obtain a higher molecular weight, less branched polymer, the aforementioned peresters, despite the requirement for refrigerated shipping and storage, having half-lives of more than 150 hours at 25° C., may be used in the presence of a suitable reducing agent.

The process of the present invention utilizes a peroxygen compound such as a peroxyester and a diacyl peroxide, in the presence of a suitable reducing agent, at a temperature where the peroxygen compound has a half-life of more than 50 hours in the absence of the reducing agent.

The peroxyesters which may be used in the process of the present invention are the alkyl and aralkyl peroxyesters of aliphatic or aromatic carboxylic acids or carbonic acid and may be represented by the structural formula

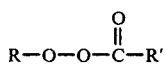

where R is an alkyl, aralkyl or alkoxycarbonyl group, R' is an alkyl, aralkyl, aryl or alkoxy group, and R and R' are the same or different. When R and/or R' contain alkyl or aralkyl moieties, the latter may contain 1–20 carbon atoms and may be primary, secondary or tertiary, linear or branched, acyclic or cyclic, saturated or unsaturated and may contain non-hydrocarbon substituents including halogen and hydroxyl groups. When R' is an aromatic moiety, it may be unsubstituted or may contain hydrocarbon, halogen and/or other substituents.

The peroxyesters may be monoperoxyesters or the diperoxyesters of dicarboxylic acids or diols.

Representative peroxyesters include t-butyl peroxyacetate, t-butyl peroxyisobutyrate, t-butyl peroxypivalate, t-butyl peroxyneodecanoate, t-butyl peroxybenzoate, t-butyl peroxyoctoate, t-butyl peroxy(2-ethylhexanoate), t-amyl peroxyneodecanoate, cumyl neodecanoate, isobutyl peroxypivalate, sec-butyl peroxybenzoate, n-butyl peroxyoctoate, t-butyl peroxy-3,3,5-trimethylhexanoate, t-butyl peroxy-2-methylbenzoate, 2,5-dimethyl-2,5-bis(2-ethylhexanoylperoxy)hexane, 2,5-dimethyl-2,5-bis(benzoylperoxy)hexane, 2,5-dimethyl-2,5-bis(octanoylperoxy)hexane, di-t-butyl diperoxyphthalate, t-butyl peroxymaleic acid, t-butyl peroxyisopropylcarbonate, di(sec-butyl) peroxydicarbonate, bis(4-t-butylcyclohexyl)peroxydicarbonate, diisopropyl peroxydicarbonate, di(n-propyl)peroxydicarbonate, di(2-ethylhexyl)peroxydicarbonate, dicyclohexyl peroxydicarbonate, dicetyl peroxydicarbonate and the like.

Aliphatic diacyl peroxides including acetyl peroxide, lauroyl peroxide, decanoyl peroxide and isononanoyl peroxide, as well as aromatic diacyl peroxides including benzoyl peroxide, p-chlorobenzoyl peroxide and 2,4-dichlorobenzoyl peroxide may be used in conjunction with the reductants of the present invention at a temperature where the diacyl peroxide has a half-life of more than 50 hours in the absence of the reductant.

The process of the present invention is carried out with a redox catalyst system consisting of a monomer-soluble peroxygen compound and a reductant. In bulk polymerization, a monomer-soluble reductant is required, while suspension polymerization permits the use of either a monomer-soluble or a monomer-insoluble reductant.

The stannous and antimony (III) salts which may be used as reductants in the practice of the present invention include the stannous and antimony (III) salts of aliphatic and aromatic carboxylic acids. The aliphatic carboxylic acids contain 1–26 carbon atoms and may be linear or branched with hydrocarbon or non-hydrocarbon substituents such as halogen groups, cyclic or acyclic, saturated or unsaturated and monocarboxylic or polycarboxylic. The aromatic carboxylic acids may be monocarboxylic or polycarboxylic, unsubstituted or substituted with hydrocarbon or non-hydrocarbon substituents. The hydrocarbon substituents in the branched aliphatic carboxylic acids or the aromatic carboxylic acids may be alkyl or aryl groups where the alkyl groups contain 1–18 carbon atoms and may be linear or branched, cyclic or acyclic, saturated or unsaturated.

Representative carboxylates include the stannous and antimony (III) salts of acetic acid, propionic acid, butanoic acid, pentanoic acid, 2-methylbutanoic acid, caproic acid, 3-methylpentanoic acid, caprylic acid, octanoic acid, 2-ethylhexanoic acid, enanthic acid, capric acid, pelargonic acid, undecanoic acid, lauric acid, myristic acid, palmitic acid, stearic acid, arachidic acid, behenic acid, lignoceric acid, cerotic acid, oxalic acid, malonic acid, succinic acid, glutaric acid, adipic acid, sebacic acid, dodecenylsuccinic acid, hexahydrophthalic acid, tetrahydrophthalic acid, oleic acid, elaidic acid, linoleic acid, α-eleostearic acid, β-eleostearic acid, α-linolenic acid, erucic acid, ricinoleic acid, maleic acid, fumaric acid, itaconic acid, crotonic acid, cinnamic acid, benzoic acid, aconitic acid, phthalic acid, citraconic acid, isophthalic acid, terephthalic acid, naphthoic acid and the like.

The peroxygen compound/reductant mole ratio is generally 1/0.01–2, with a preferred mole ratio of 1/0.1–1. The addition of the peroxygen compound and the reductant to the reaction mixture may be made in any order, with the total amount of either or both being added initially or intermittently as the reaction proceeds.

The concentration of peroxygen compound is generally 0.01–5% by weight of the vinyl monomer, with a preferred concentration of 0.05–1% by weight.

The procedures normally used in the bulk and suspension polymerization of vinyl chloride are applicable to the process of the present invention. Typical procedures are described in Encyclopedia of Polymer Science and Technology, 14, 339–343 (1971), the disclosure of which is incorporated herein by reference.

The polymerization may be conducted at or above atmospheric pressure. In the usual procedure, the reactor is charged at atmospheric pressure and the pressure rises when the contents of the reactor are brought to reaction temperature. The pressure may increase further due to the reaction exotherm and then remain constant until the conversion reaches about 70%, after which it decreases rapidly as the reaction continues.

The polymerization temperature may range from −50° to +70° C. for bulk polymerization, although temperatures of 40° to 60° C. are preferred. Suspension polymerization may be carried out at temperatures of +5° to +70° C., although preferred temperatures are in the 20°–60° C. range.

The concentrations of monomer and water, e.g. about 2/1 weight ratio, and the types and concentrations of suspending agents are those normally used in suspension polymerization and are well known to those skilled in the art. Typical suspending agents include poly(vinyl alcohol), partially saponified poly(vinyl acetate), gelatin, methylcellulose, vinyl acetate-maleic anhydride copolymer and the like. Various emulsifiers such as sulfonated oils and ethylene oxide condensation products may be added to control surface tension and particle shape. Buffers may be used, where necessary, e.g. when gelatin is used as suspending agent. Chain transfer agents such as chlorinated hydrocarbons and isobutylene may be used in the preparation of low molecular weight polymer.

Although the peroxygen compound-reductant catalyst system of the present invention is particularly useful in the bulk and suspension polymerization of vinyl chloride, the redox system may also be used in the copolymerization of vinyl chloride with vinylidene chloride, vinyl acetate and other monomers which undergo copolymerization with vinyl chloride.

The homopolymerization and copolymerization of other ethylenically unsaturated monomers which are subject to free radical polymerization may be carried out with the peroxygen compound-reductant catalyst system of the present invention. Representative monomers include ethylene, vinylidene chloride, styrene, vinyltoluene, α-methylstyrene, p-chlorostyrene, p-chloromethylstyrene, butadiene, isoprene, piperylene, chloroprene, vinyl acetate, vinyl propionate, vinyl benzoate, acrylic and methacrylic esters including methyl acrylate, ethyl acrylate, butyl acrylate, 2-ethylhexyl acrylate, lauryl acrylate, methyl methacrylate, ethyl methacrylate, butyl methacrylate, lauryl methacrylate, octadecyl methacrylate, acrylic acid, methacrylic acid, acrylonitrile, methacrylonitrile, acrylamide, methacrylamide, maleic anhydride and the like. The ethylenically unsaturated monomers which undergo polymerization in the presence of a free radical initiator are well known to those skilled in the art and undergo homopolymerization and copolymerization in the presence of the peroxygen compound-reductant catalyst system of the present invention.

The stannous and antimony (III) carboxylates are ineffective as reductants in the attempted suspension and bulk polymerizations of vinyl chloride at 50° C. in the presence of di-t-butyl peroxide and t-butyl hydroperoxide, respectively.

The following examples are illustrative embodiments of the practice of the present invention and are not to be construed as limitations on the invention or the claims. Numerous modifications will be obvious to those skilled in the art.

EXAMPLE I

A. Six 4 oz glass bottles were each charged with the following suspension recipe:

21 ml distilled water (boiled)
1 ml 1% aqueous solution of Tween 60
1 ml 1% aqueous solution of Span 60
2 ml 1% aqueous solution of Methocel A15

Tween 60 is polyoxyethylene sorbitan monostearate (Atlas Chemical Industries Inc.), Span 60 is sorbitan monostearate (Atlas Chemical Industries Inc.) and Methocel A15 is methylcellulose having a viscosity of 15 cps as a 2% aqueous solution (Dow Chemical Co.). Nitrogen was bubbled through the aqueous solution for 15 minutes.

Gaseous vinyl chloride was purified by passage through two 5% aqueous sodium hydroxide solutions, dried by passage through a silica gel column and then condensed with the aid of a dry ice bath. After 10 g liquid vinyl chloride was added to the suspension recipe, the bottle was closed with a screw cap containing a center hole and a self-sealing gasket. The addition of 0.07 ml (0.23 mmole) stannous octoate (purified by treatment with activated alumina) and 0.11 ml (0.46 mmole) t-butyl peroxyoctoate (1% by weight of vinyl chloride) was made by injection through the gasket using a hypodermic syringe. The bottles were placed in a 50° C. constant temperature bath and shaken for 2-20 hours. Bottles were removed at intervals and the residual monomer was released by inserting a needle into the gasket. The poly(vinyl chloride) was weighed and the conversions, as a function of reaction time, are shown in the following table.

| No. | Reaction time, hrs | Conversion, % |
|---|---|---|
| 1 | 2 | 10 |
| 2 | 4 | 19 |
| 3 | 7 | 35 |
| 4 | 9 | 60 |
| 5 | 11 | 80 |
| 6 | 20 | 92 |

B. A bottle was charged in the same manner and with the same reactants as in A, except for the omission of stannous octoate. No polymer was isolated after 20 hours at 50° C.

EXAMPLE II

The procedure of Example I was repeated, using the same suspension recipe, with 10 g vinyl chloride, 0.035 ml (0.115 mmole) stannous octoate and 0.055 ml (0.23 mmole) t-butyl peroxyoctoate (0.5% by weight of vinyl chloride). After 12 hours at 50° C., the conversion was 45%.

EXAMPLE III

The procedure of Example I was repeated, using the same suspension recipe, with 10 g vinyl chloride, 0.078 g (0.115 mmole) stannous stearate and 0.055 ml (0.23 mmole) t-butyl peroxyoctoate. After 18 hours at 50° C. the conversion was 30%.

EXAMPLE IV

The procedure of Example I was repeated with five bottles, using the same suspension recipe, with 10 g vinyl chloride, 0.11 ml (0.46 mmole) t-butyl peroxyoctoate and 0.125 g (0.23 mmole) stannous laurate. The bottles were removed after 2-15 hours in a constant temperature bath at 50° C. The conversions, as a function of reaction time, are shown in the following table.

| No. | Reaction time, hrs | Conversion, % |
|---|---|---|
| 1 | 2 | 10 |
| 2 | 6 | 40 |
| 3 | 8 | 65 |
| 4 | 10 | 90 |
| 5 | 15 | 96 |

The intrinsic viscosity of the poly(vinyl chloride) from No. 5 was 0.74 dl/g in tetrahydrofuran at 30° C.

EXAMPLE V

The procedure of Example I was repeated, using the same suspension recipe, with 10 g vinyl chloride, 0.055 ml (0.23 mmole) t-butyl peroxyoctoate and 0.062 g (0.115 mmole) stannous laurate. The conversion was 45% after 9 hours at 50° C.

EXAMPLE VI

The same reactants and procedure as in Example V were used in the polymerization of vinyl chloride in the presence of t-butyl peroxyoctate and stannous laurate at 55° C. After 9 hours the conversion was 60%.

EXAMPLE VII

The procedure of Example I was repeated using a 6 oz bottle charged with the following suspension recipe:
42 ml distilled water
2 ml 1% aqueous solution of Tween 60
2 ml 1% aqueous solution of Span 60
4 ml 1% aqueous solution of Methocel A15
and 20 g vinyl chloride, 0.12 g (0.23 mmole) stannous laurate and 0.11 ml (0.46 mmole) t-butyl peroxyoctate (0.5% by weight of vinyl chloride). The bottle was shaken at 50° C. for 16 hours. The residual monomer was released and the polymer was washed with water and methanol. The yield of polymer was 19.5 g (97.5%).

The rate of evolution of hydrogen chloride from the polymer at 180° C. was slightly slower than that from poly(vinyl chloride) prepared with t-butyl peroxypivalate at 50° C. in the absence of a reductant, while differential thermal analysis showed that both polymers had the same temperatures for the onset of decomposition and the peak exotherm.

EXAMPLE VIII

The procedure of Example I was repeated, using the same suspension recipe, with 10 g vinyl chloride, 0.022 g (0.115 mmole) stannous acetate and 0.055 ml (0.23 mmole) t-butyl peroxyoctate. The yield of polymer was 4.8 g (48% conversion) after 17 hours at 50° C.

EXAMPLE IX

The procedure of Example I was repeated, using the same suspension recipe, with 10 g vinyl chloride, 0.067 ml (0.2 mmole) stannous octoate and 0.14 ml (0.4 mmole) t-butyl peroxyneodecanoate (1% by weight of vinyl chloride). After 15 hours at 25° C., the conversion was 35%.

EXAMPLE X

The procedure of Example I was repeated, using the same suspension recipe, with 10 g vinyl chloride, 0.11 ml (0.46 mmole) t-butyl peroxyoctate and 0.14 ml (0.46 mmole) stannous octoate. The bottle was shaken at 50° C. for 10 hours to yield 7.9 g polymer.

EXAMPLE XI

The procedure of Example I was repeated, using the same suspension recipe. After the bottle was charged with the latter, followed by 10 g vinyl chloride, 0.11 ml (0.46 mmole) t-butyl peroxyoctate (1% by weight of vinyl chloride) and 0.07 ml (0.23 mmole) stannous octoate, the bottle was shaken for 5 hours at 50° C. The bottle was cooled to 25° C. and an additional 0.07 ml (0.23 mmole) stannous octoate was added. The bottle was again placed in the 50° C. bath and shaken for 5 hours at 50° C. The yield of polymer was 8.9 g.

EXAMPLE XII

A. The procedure of Example I was repeated, using the same suspension recipe, with 10 g vinyl chloride, 0.11 ml (0.46 mmole) t-butyl peroxyoctate (1% by weight of monomer) and 0.07 ml (0.23 mmole) stannous octoate. After 5 hours at 50° C., the bottle was cooled to 25° C. and an additional 0.11 ml (0.46 mmole) t-butyl peroxyoctate (1% by weight of monomer) was added. After an additional 5 hours at 50° C., the yield of polymer was 9.9 g.

B. The procedure in A was repeated in the absence of stannous octoate, using the same total of 2% t-butyl peroxyoctate. No polymer was isolated after 10 hours at 50° C.

EXAMPLE XIII

Liquid vinyl chloride (24 g) was charged to a pre-weighed, nitrogen-flushed bottle containing a screw cap with a center hole and a self-sealing gasket. The bottle was closed and 0.27 ml (1.1 mmole) t-butyl peroxyoctate (1% by weight of vinyl chloride) and 0.18 ml (0.55 mmole) stannous octoate were injected by hypodermic syringe. After 5 hours at 50° C., the bulk polymerization yielded 7.8 g (32.5% conversion) of poly(vinyl chloride).

EXAMPLE XIV

The procedure of Example I was repeated with three bottles, using the same suspension recipe with 10 g vinyl chloride, 0.34 g (0.165 mmole) antimony triacetate and 0.055 ml (0.23 mmole) t-butyl peroxyoctate (0.5% by weight of vinyl chloride). Bottles were removed from the constant temperature bath after 6, 9 and 12 hours at 50° C. and the polymer was recovered. The conversions are shown in the following table.

| No. | Reaction time, hrs | Conversion, % |
|---|---|---|
| 1 | 6 | 19 |
| 2 | 9 | 30 |
| 3 | 12 | 60 |

EXAMPLE XV

The procedure of Example I was repeated, using the same suspension recipe, with 10 g vinyl chloride, 0.07 ml (0.206 mmole) stannous octoate and 0.14 g (0.413 mmole) benzoyl peroxide (1% by weight of vinyl chloride). After 12 hours at 50° C., the yield of poly(vinyl chloride) was 7.3 g (73% conversion).

EXAMPLE XVI

A. A 100 ml glass bottle was charged with 10 ml of an aqueous solution containing 0.0006 g Nacconol 90F anionic alkyl aryl sulfonate (Allied Chemical Co.) and 0.06 g tricalcium phosphate. The contents were stirred thoroughly to wet the solids and the mixture was degassed by bubbling nitrogen through the suspension for 15 minutes. After 10 g distilled styrene, 0.11 ml (0.46 mmole) t-butyl peroxyoctate (1% by weight of styrene) and 0.07 ml (0.23 mmole) stannous octoate were introduced, the bottle was closed under nitrogen and shaken in a constant temperature bath at 50° C. for 12 hours. The reaction mixture was cooled to 25° C., the aqueous layer was separated and the residue was dissolved in acetone. The polymer was precipitated in methanol, filtered and dried in vacuo at 40° C. The yield of polystyrene was 9 g (90% conversion).

B. A bottle was charged in the same manner and with the same reactants as in A except for the omission of stannous octoate. After 12 hours at 50° C., the yield of polystyrene was 1.5 g (15% conversion) due to thermal polymerization.

EXAMPLE XVII

A. A 100 ml glass bottle was charged with 10 g styrene, 0.11 ml (0.46 mmole) t-butyl peroxyoctoate and 0.07 ml (0.23 mmole) stannous octoate. The bottle was closed under nitrogen and the bulk polymerization was carried out in a bath at 50° C. for 12 hours. After cooling to 25° C., the contents were dissolved in acetone and the polymer was precipitated in methanol. Filtration and drying in vacuo at 40° C. gave 9 g (90% conversion) polystyrene.

B. A bottle was charged in the same manner and with the same reactants as in A, except that stannous octoate was omitted. After 13 hours at 50° C., the yield of polymer was 1.4 g (14% conversion).

EXAMPLE XVIII

A. A 100 ml glass bottle was charged with 10 g methyl methacrylate, 0.11 ml (0.46 mmole) t-butyl peroxyoctoate and 0.07 ml (0.23 mmole) stannous octoate. After 4.5 hours at 50° C. the contents were cooled to 25° C., dissolved in acetone and precipitated in methanol. The yield of polymer was 9 g (90%).

B. A bottle was charged in the same manner and with the same reactants as in A except that stannous octoate was omitted. No polymer was recovered after 4.5 hours at 50° C.

U.S. Pat. No. 4,091,197 discloses a microsuspension process for the polymerization of vinyl chloride in the presence of a seed consisting of a previously prepared dispersion of poly(vinyl chloride) containing an organo-soluble initiator, wherein the initiator is activated during the polymerization by an "organo-soluble metal complex formed throughout the polymerization by reacting a water-soluble salt of a metal selected from the group consisting of iron, copper, cobalt, nickel, zinc, tin, titanium, vanadium, manganese, chromium and silver, with a complexing agent progressively introduced throughout the polymerization."

There is no disclosure that the activation of the initiator by the "organo-soluble metal complex" permits the polymerization to be conducted at a temperature where the initiator would be ineffective in the absence of the "complex". In fact, the polymerization is "carried out at the usual temperatures", i.e. generally between 30° and 70° C. using lauroyl peroxide and other indicated aliphatic diacyl peroxides at temperatures where they are normally effective, i.e. lauroyl peroxide at 42° C. (Example 2) and 52° C. (Examples 1 and 3–7).

Notwithstanding the above, the major disclosure which is relevant to the present invention, is the assumed formation of an "organo-soluble metal complex", either beforehand or in situ. However, there is no evidence that there is any interaction between the reactants to yield a product which could be prepared and isolated beforehand or that the assumed product of interaction generated in situ, i.e. the "complex", if any, is organo-soluble. The only disclosure is that when lauroyl peroxide is present together with a metallic salt in a microsuspension of poly(vinyl chloride) and a "complexing agent" is added during the polymerization (Examples 1–5) or initially (Examples 6 and 7), the rate of polymerization is increased as compared with the rate in the absence of both the metallic salt and the "complexing agent". The only preformed complexes specifically identified are the acetylacetonates of vanadium, titanium, chromium and nickel and there is no evidence that the acetylacetonates are formed by the reaction of the metallic salt and acetylacetone in an aqueous medium or that a mixture of the metallic salt and acetylacetone give the same polymerization results as the preformed acetylacetonate presumed to be formed therefrom.

In the table in Example 7 in U.S. Pat. No. 4,091,197, stannic chloride is disclosed as the metallic salt with ascorbic acid as complexing agent in Test S, while copper sulphate is disclosed as the metallic salt with octoic acid as the complexing agent in Test D. Since one of the reductants in the present invention is the tin salt of a carboxylic acid, the formation of an organosoluble "complex" from stannic chloride and octoic acid, which would be equivalent to a preformed tin carboxylate, according to U.S. Pat. No. 4,091,197, was investigated, as described in Example XIX.

EXAMPLE XIX

After 2 g (7.69 mmoles) stannic chloride was dissolved in 100 ml distilled water, 0.6 ml (0.55 g, 3.82 mmoles) of alumina-treated 2-ethylhexanoic acid and 10 ml distilled methylene chloride were added to the clear solution. The glass bottle containing the mixture was closed under nitrogen and shaken for 1 hour in a 50° C. constant temperature bath. The bottle was then cooled to 25° C., the organic layer was removed and the aqueous layer was extracted with 3×75 ml methylene chloride. The organic layers were combined and dried over anhydrous magnesium sulfate. The methylene chloride was removed in a rotary evaporator and the residue was examined by thin layer chromatography, using a silica gel plate and developing with acetone as carrier. A sample of the starting octoic acid and stannous octoate were examined by thin layer chromatography under the same conditions. The development of stannous octoate showed no movement and a dark spot remained at $R_f = 0$. The development of octoic acid showed major movement at $R_f = 0.91$ and a very small clear spot at $R_f = 0$. The development of the methylene chloride-soluble reaction residue showed major movement at $R_f = 0.91$ and a very small clear spot at $R_f = 0$, identical to the behavior of octoic acid, indicating the absence of a reaction between stannic chloride and octoic acid.

Example XIX demonstrates that stannic chloride and octoic acid, in the presence of water and methylene chloride, do not undergo reaction, complexation or any other type of interaction, to yield an organo-soluble metallic "complex" which would be identical to a preformed, stable organo-soluble tin carboxylate.

An attempt to isolate an organo-soluble product from the reaction of stannic chloride and ascorbic acid at 50° C. in distilled water, as disclosed in U.S. Pat. No. 4,091,197, also failed to yield any soluble reaction product. However, the results in U.S. Pat. No. 4,091,197 may be related to the earlier disclosed use of ascorbic acid in combination with metal salts in the emulsion polymerization of vinyl chloride in the presence of various water-soluble peroxygen compounds, including hydrogen peroxide, cumene hydroperoxide, potassium persulfate and acetyl cyclohexane sulfonyl peroxide, as disclosed in Japanese Patent Nos. 16,591 ('60) and 18,954 ('64), British Patent Nos. 931,628 and 1,180,363 and Netherlands Patent Application No. 6,408,790.

While particular embodiments of this invention have been disclosed above, it will be understood that the invention is obviously subject to variation and modification without departing from its broader aspects.

What is claimed is:

1. A process for the preparation of polymers and copolymers of ethylenically unsaturated monomers subject to free radical polymerization, which consists in polymerization in bulk or suspension, at a temperature of 70° C. or below in the presence of a redox catalyst system consisting of a peroxygen compound selected from the class consisting essentially of peroxyesters and diacyl peroxides, and a reducing agent selected from the class consisting of stannous carboxylates and antimony (III) carboxylates, and where the peroxygen compound/reducing agent mole ratio is 1/0.01-2 and wherein the polymerization is carried out at a temperature where the peroxygen compound has a half-life of more than 50 hours in the absence of the reducing agent.

2. The process of claim 1 wherein said monomer is vinyl chloride.

3. The process of claim 1 wherein said polymerization temperature is in the range from −50° to +70° C.

4. The process of claim 1 wherein said polymerization temperature is between 20° and 60° C.

5. The process of claim 1 wherein said peroxyester is selected from the class consisting of alkyl peroxyesters of aliphatic carboxylic acids, aromatic carboxylic acids and carbonic acid.

6. The process of claim 1 wherein said reducing agent is the stannous or antimony (III) salt of an aliphatic or aromatic carboxylic acid.

7. The process of claim 6 wherein said stannous carboxylate is selected from the class consisting of stannous octoate, stannous laurate and stannous stearate.

8. The process of claim 5 wherein said peroxyester is t-butyl peroxyoctoate.

9. The process of claim 1 wherein said diacyl peroxide is selected from the class consisting of lauroyl peroxide and benzoyl peroxide.

10. The process of claim 1 wherein said antimony (III) carboxylate is antimony triacetate.

11. The process of claim 1 wherein said monomer is styrene.

12. The process of claim 1 wherein said monomer is methyl methacrylate.

* * * * *